Figure 1:
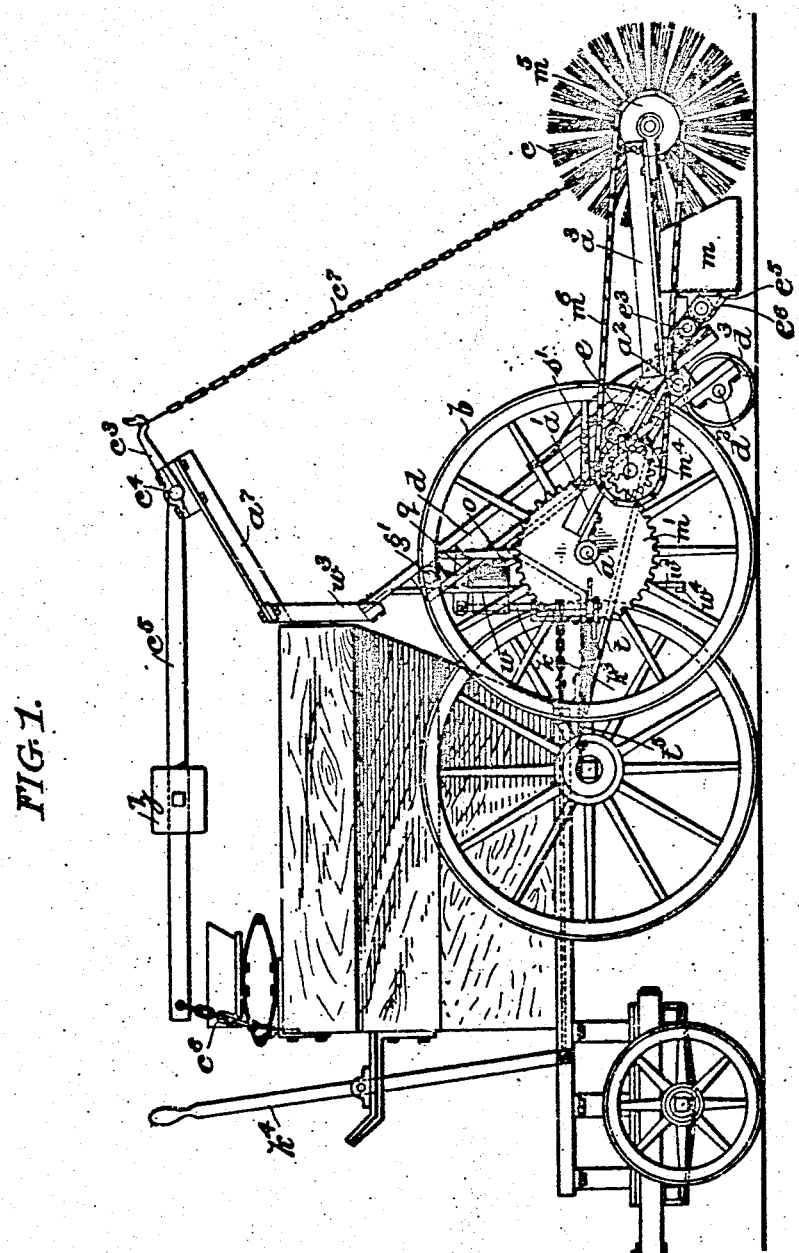

No. 793,700. PATENTED JULY 4, 1905.
Z. WHITTEMORE.
SELF LOADING DEVICE FOR CARTS.
APPLICATION FILED NOV. 24, 1903.

5 SHEETS—SHEET 1.

WITNESSES:

INVENTOR
Zenas Whittemore

BY
ATTORNEY.

No. 793,700. PATENTED JULY 4, 1905.
Z. WHITTEMORE.
SELF LOADING DEVICE FOR CARTS.
APPLICATION FILED NOV. 24, 1903.

5 SHEETS—SHEET 3.

WITNESSES:

INVENTOR
Zenas Whittemore
BY
ATTORNEY

No. 793,700. PATENTED JULY 4, 1905.
Z. WHITTEMORE.
SELF LOADING DEVICE FOR CARTS.
APPLICATION FILED NOV. 24, 1903.

5 SHEETS—SHEET 4.

No. 793,700. PATENTED JULY 4, 1905.
Z. WHITTEMORE.
SELF LOADING DEVICE FOR CARTS.
APPLICATION FILED NOV. 24, 1903.
5 SHEETS—SHEET 5.
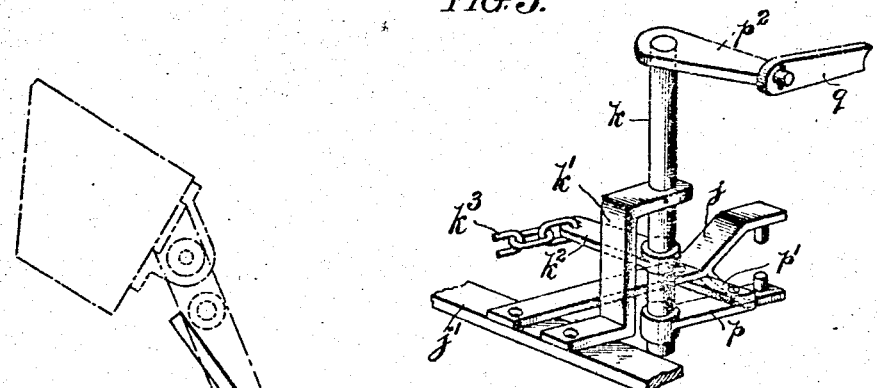
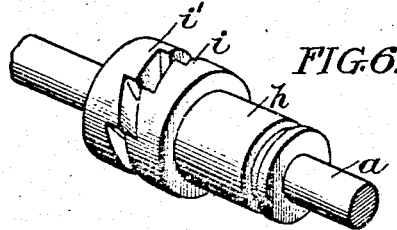
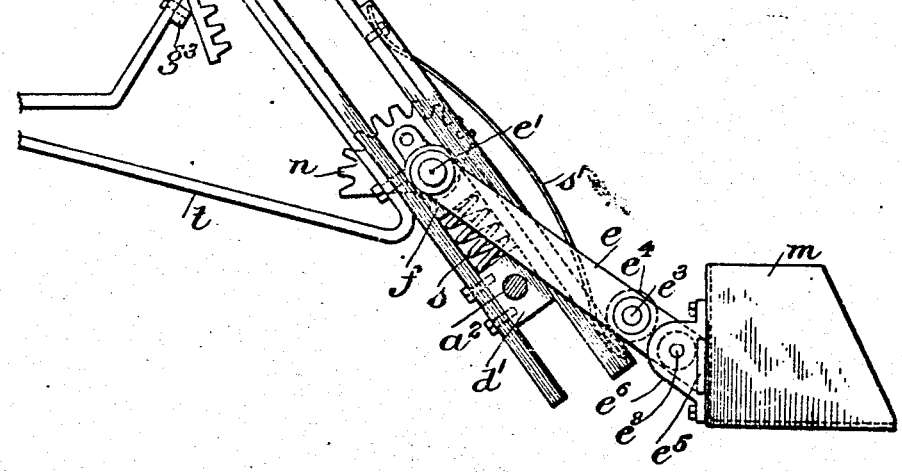
WITNESSES:
INVENTOR
Zenas Whittemore
BY
ATTORNEY.

No. 793,700.
Patented July 4, 1905.

UNITED STATES PATENT OFFICE.

ZENAS WHITTEMORE, OF MORTON, PENNSYLVANIA.

SELF-LOADING DEVICE FOR CARTS.

SPECIFICATION forming part of Letters Patent No. 793,700, dated July 4, 1905.

Application filed November 24, 1903. Serial No. 182,453.

*To all whom it may concern:*

Be it known that I, ZENAS WHITTEMORE, of Morton, Delaware county, State of Pennsylvania, have invented an Improvement in Self-Loading Devices for Carts, of which the following is a specification.

More particularly my invention relates to self-loading devices for carts, and is shown applied to a street-sweeper of the general character shown in my Letters Patent No. 730,502, dated June 9, 1903, in which a sweepings-pan arranged close to a rotating brush is from time to time raised and turned over to discharge the sweepings into a receptacle. In that patent the brush and sweepings-pan and their operating devices are formed on and constitute a part of the wheeled vehicle which carries the receptacle, the pan-operating devices being operated by the rear axle of the vehicle through the medium of clutch mechanism, which is automatically released when the pan has discharged its contents to permit the pan to return.

One of the features of the present invention consists in arranging the self-loading mechanism on a separate frame or truck independent of the cart or vehicle which carries the receptacle, to which it may be detachably connected for use and from which it may be disconnected when the cart is filled to enable the cart to be driven off and its contents to be emptied, while an empty cart may be brought up and attached to the self-loading mechanism. Thus an attachment may be used with a number of carts, and it is unnecessary to carry back the loading devices every time a cart is returned to the dumping-ground or elsewhere.

While I have shown the detachable truck provided with my improved self-loading devices particularly applied to a street-sweeper, I do not mean to limit my invention to this particular application, as the detachable truck may be provided with suitable self-loading mechanism for loading a cart with other material—as, for example, in a hay-loader.

The clutch mechanism for controlling the movements of the loading-pan is arranged on the axle-shaft of the wheeled truck with suitable detachable connections for operating it from the ordinary cart.

Another part of my invention relates to the arrangement and manner of supporting the brush or collecting device to enable the pavement or ground to be swept close to the curb or obstructions and to enable the collecting device to be easily raised and lowered to pass over obstructions or to suspend the collecting operation.

My invention also embraces improvements in the pan-elevating devices and in the mechanism for automatically releasing the clutch to allow the pan to return after it has discharged its contents and to other improvements and combinations of parts, which are fully set forth hereinafter.

Figure 2:
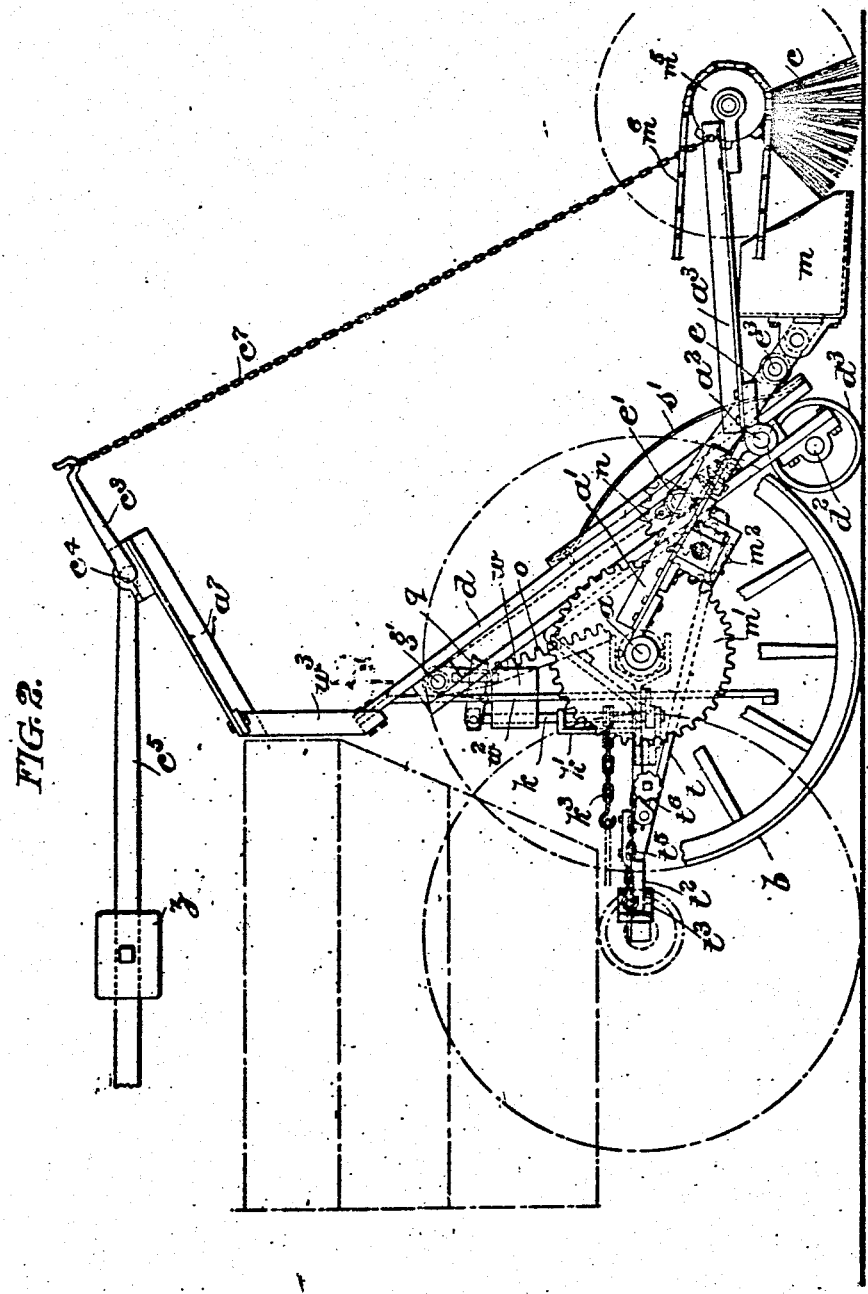
Figure 3:
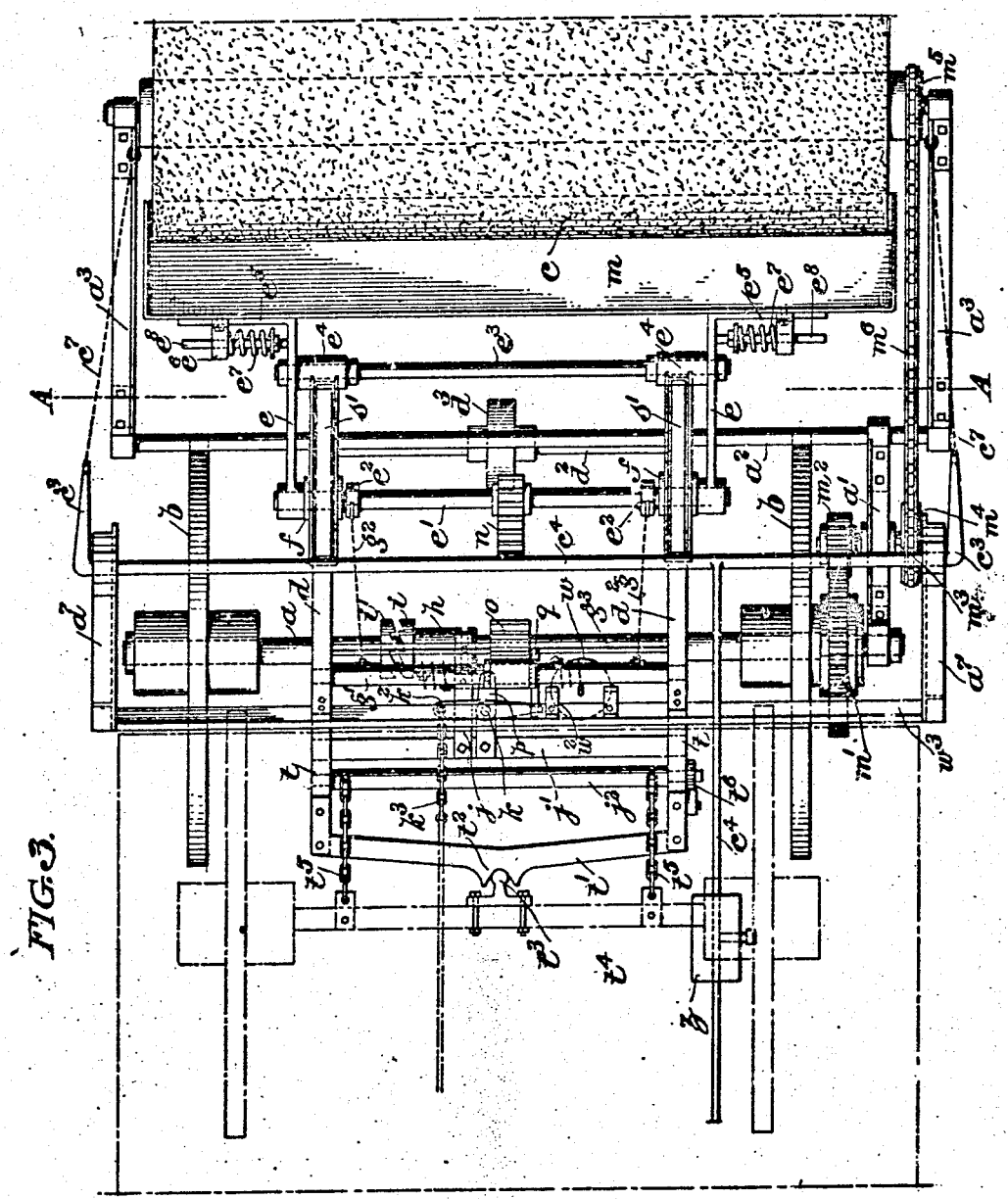
Figure 4:
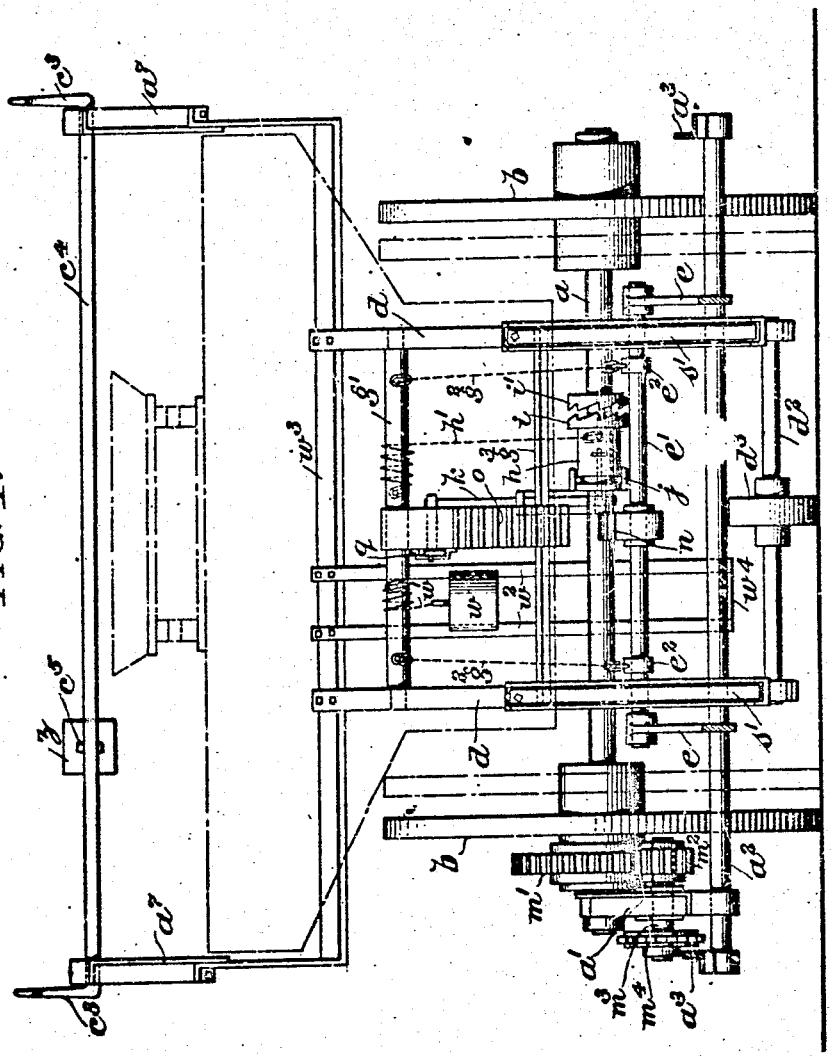

In the drawings, Figure 1 is a side elevation of my self-loading attachment applied to a cart and adapted for street-sweeping. Fig. 2 is a side elevation, on an enlarged scale, of the self-loading attachment detached from the cart. Fig. 3 is a plan view of the same. Fig. 4 is a vertical section on the line A A of Fig. 3. Fig. 5 is a perspective view of the clutch-operating mechanism. Fig. 6 is a perspective view of the clutch, and Fig. 7 is a side elevation of the devices for turning the loading-pan.

The self-loading devices and mechanism for elevating the pan to discharge its contents may, if desired, be carried by and form a part of the wheeled vehicle or cart which carries the receptacle. It is to be understood, therefore, that where the term "a wheeled frame" is used in the claims, unless otherwise limited, it refers either to the vehicle carrying the receptacle or to the separate wheeled truck. I prefer, however, to arrange all of the self-loading devices on a separate and independent wheeled frame or truck adapted to be attached to an ordinary cart. When a cart is filled, it may be detached from the sweeping attachment and driven off, while the attachment may be applied to an empty cart.

*a* is the axle-shaft of the attachment, to which the wheels *b b* are secured.

*a'* is a bracket supported at one end by the extremity of the shaft *a* and at the other end by a shaft $a^2$, carrying arms $a^3$ $a^3$, in the end of which the brush $c$ is journaled. The brush is driven by the axle-shaft $a$, through suitable power-transmitting connections, such as the gear $m'$ on the axle-shaft $a$, engaging a gear $m^2$ on a counter-shaft $m^3$ in the bracket $a'$, and a sprocket-wheel $m^4$ on the shaft $m^3$, transmitting motion to the sprocket-wheel $m^5$ on the brush-shaft through the chain $m^6$.

$d\ d$ are inclined slide frames or guides carrying at their lower ends boxes $d'$, in which the shaft $a^2$ is journaled, and having upon their extremities an axle $d^2$, on which is mounted a small wheel $d^3$, running upon the ground.

The pan $m$ is carried by arms $e\ e$ of a rock-shaft $e'$, journaled in slides $f\ f$ in the inclined guides $d\ d$.

In the upper ends of the slide-frames $d\ d$ is journaled a shaft $g'$, which is connected by chains or cables $g^2$ with collars $e^2\ e^2$ on the shaft $e'$. The shaft $g'$ is connected by a chain or cable $h'$ with a sleeve $h$ on the axle-shaft $a$, which carries the movable clutch member $i$. The other clutch member $i'$ is fast on the axle-shaft $a$ and rotates with it. The clutch member $i$ is controlled by the usual shifter-yoke $j$, pivoted to a cross-bar $j'$ on the brackets $t\ t$, carried by the guides $d\ d$.

$k$ is a short upright rock-shaft journaled in a bracket $k'$ on the cross-bar $j'$ and provided at its lower end with an arm $p$, connected by a link $p'$ with the shifter-yoke $j$. On the upper end of the shaft $k$ is an arm $p^2$, which carries a laterally-projecting finger $q$, arranged between the slide-frames $d\ d$ and when projected extending into the path of the shaft $e'$ when it reaches its maximum height. (See dotted lines in Fig. 7.)

$k^2$ is an arm on the shaft $k$, which is detachably connected in any suitable manner, as by the chain and rod $k^3$, with the operating-lever $k^4$ on the cart, Fig. 1.

$o$ is a toothed rack suspended at the top on the shaft $g'$ between the guide-frames $d\ d$ and secured at the bottom to a cross-bar $g^3$ between the brackets $t\ t$, secured to said frames.

$n$ is a toothed gear on the rock-shaft $e'$, adapted when the shaft is elevated in the slide-frames $d\ d$ to engage the rack $o$, and thereby turn the rock-shaft $e'$ in its bearings and rock the arms $e\ e$ and pan $m$ into the position shown in dotted lines in Fig. 7, when the contents of the pan will be discharged into the cart. To more effectively discharge the contents, it is desirable to accelerate the motion of the pan as it is turned. For this purpose the gear $n$ is made of eccentric form, as shown, and is arranged so that the portion of largest diameter will first come into engagement with the rack.

The operation of the pan elevating and releasing devices is as follows: When the driver throws the lever $k^4$, the rock-shaft $k$ is rocked and through the arm $p$ and link $p'$ operates the shifter $j$ and throws in the clutch. At the same time the rocking of the shaft $k$ throws the finger $q$ forward into the path of the shaft $e'$. The sleeve of the clutch member $i$ being now connected with the axle-shaft rotates with it and winds up the chain $h'$, which unwinding from the shaft $g'$ rotates that shaft and winds up the chains $g^2\ g^2$, lifting the shaft $e'$ in the guides $d\ d$ and elevating the pan $m$. When the gear $n$ engages the rack $o$, the pan is turned, so that on reaching its highest position it is turned over to empty the contents into the cart. At this time the shaft $e'$ strikes the finger $q$ and pushes it back, whereby the shaft $k$ is rocked back to its former position and the clutch $i\ i'$ is released. The pan-elevating mechanism is then disconnected, and the shaft $e'$ and pan $m$ return by gravity to their normal positions. To counterbalance the pan and render its descent less sudden, a weight $w$ may be suspended from the shaft $g'$ by a chain $w'$, so that when the pan is lowered the chain $w'$ will be wound upon the shaft $g'$ and will elevate the weight. The weight $w$ is guided between two vertical guides $w^2$, suspended from a cross-bar $w^3$, carried by the guide-frames $d\ d$. At the end of the guides $w^2$ is a support $w^4$, upon which the weight $w$ may rest when in its lowest position, so as to relieve the pan of its counterbalancing effect when the pan is elevated into its highest position, and thus not impede the return of the pan at the beginning of its return movement. After the pan has descended to a small extent the weight $w$ is lifted and its counterbalancing effect commences.

To prevent the pan descending with too great a jar, spring-buffers $s$ are arranged in the lower ends of the guides $d\ d$ to receive the shock of the shaft $e'$.

Leaf-springs $s'$ are arranged on the outer faces of the frames $d\ d$ at their lower ends to receive the contact of a cross-bar $e^3$ between the pan-arms $e\ e$ when the pan-frame is turned back in its descent, and this cross-bar is provided with rollers $e^4$ at the points where it makes contact with the springs $s'$.

$t\ t$ are rearwardly-extending brackets secured to the guide-frames $d\ d$ and forming, with the cross-bars $t'\ j''$, a truck-frame adapted to be detachably connected with the running-gear of the cart. As shown, the cross-bar $t'$ is provided with jaws $t^2$, adapted to receive a knuckle $t^3$ on the axle $t'$ of the cart, and chains $t^5\ t^5$, carried by the axle, are attached to pins on a shaft $j^2$, journaled in the brackets $t\ t$. By turning the shaft $j^2$ the chains may be drawn taut. A ratchet and pawl $t^6$ secure the shaft against rotation. To detach the attachment from the cart, it is necessary only to turn the shaft $j^2$ to slacken the chains, detach the chains from their pins, and then detach the chain $k^3$ from its rod. While this construction for attaching the self-loading devices is simple and convenient, any other suitable devices may be employed for the purpose without affecting the invention.

To enable the brush or collecting device $c$ to be raised and lowered, the arms $a^3 a^3$ which carry it are journaled on the ends of the shaft $a^2$ and are connected by chains $c^2 c^2$ with arms $c^3$ of a rock-shaft $c^4$, journaled in brackets $a^7$, carried by a frame $m^3$, carried by the guide-frames $d\ d$. The rock-shaft $c^4$ is provided with a lever $c^5$, extending over the cart to the driver's seat and adapted to be secured by a chain $c^6$. By depressing the lever $c^5$ the driver may raise the brush to pass over large obstructions and when required may secure it in elevated position by the chain $c^6$. Owing to the weight of the brush and the arms $a^3 a^3$, the lever $c^5$ may be counterweighed by an adjustable weight $z$. With this arrangement of the collecting device $c$ in arms $a^3 a^3$ on the shaft $a^2$, journaled in the guide-frames $d\ d$, the ends of the collecting device may be extended at each side to a substantial distance beyond the plane of the vehicle-wheels. This enables the collecting device to be brought close to the curb or obstructions while in operation and in a street-sweeper permits the pavement to be swept close to the curb on either side of the street.

To prevent the straining of the pan $m$ if it should come in contact with the curb or any other obstruction, I prefer to support it on the arms $e\ e$, with provision for endwise movement. For this purpose the ends of the arms $e\ e$ terminate in flat guides $e^5 e^5$, which rest against the back of the pan and are embraced by ears $e^6 e^6$, carried by the pan. Between these ears and the arms $e$ are interposed springs $e^7$, which tend to hold the pan in normal central position, but permit it to yield longitudinally under strain. As shown, the springs $e^7$ are carried on pins $e^8$ on the arms $e$, projecting through the ears $e^6$.

What I claim as new, and desire to secure by Letters Patent, is as follows:

1. In a self-loading device for carts, the combination in the pan elevating and operating devices, of a wheeled frame, inclined guides carried thereby, a rock-shaft guided in said guides, arms carried by said rock-shaft, a pan carried by said arms, a gear carried on said rock-shaft between the guides, a rack supported by the wheeled frame in position to be engaged by said gear and means to raise and lower said rock-shaft by said gear in its guides.

2. In a self-loading device for carts, the combination in the pan elevating and operating devices, of a wheeled frame, inclined guides carried thereby, a rock-shaft guided in said guides, arms carried by said rock-shaft, a pan carried by said arms, an eccentric gear carried on said rock-shaft between the guides, a rack supported by the wheeled frame in position to be engaged by said gear, and means to raise and lower said rock-shaft on its guides.

3. In a self-loading device for carts, the combination in the pan elevating and operating devices, of a wheeled frame, inclined guides carried thereby, a rock-shaft guided in said guides, arms carried by said rock-shaft, a pan carried by said arms, a gear carried on said rock-shaft between the guides, a rack supported by the wheeled frame in position to be engaged by said gear, means to raise and lower said rock-shaft on its guides, and spring-buffers in the lower ends of said guides.

4. In a self-loading device for carts, the combination in the pan elevating and operating devices, of a wheeled frame, inclined guides carried thereby, a pan, arms carrying said pan, means to raise and lower said arms and pan in the guides and to turn said pan and arms during reciprocation, extended buffer-springs $s'\ s'$ adjacent to the ends of said guides, and parts carried by said arms adapted to contact with said buffer-springs when said arms are turned back and the pan is lowered.

5. In a self-loading device for carts, the combination in the pan elevating and operating devices, of a wheeled frame, inclined guides carried thereby, a pan, arms carrying said pan, means to raise and lower said arms and pan in the guides and to turn said pan and arms during reciprocation, extended buffer-springs $s'\ s'$ adjacent to the ends of said guides, and cross-bar $e^3$ carried by said arms adapted to strike said buffer-springs when the arms are turned back and the pan is lowered.

6. In a self-loading device for carts, the combination in the pan elevating and operating devices, of a wheeled frame, inclined guides carried thereby, a rock-shaft guided in said guides, arms carried by said rock-shaft, a pan carried by said arms, a cross-bar connecting said arms and extending above the guides, and means to raise and lower said rock-shaft in the guides and to turn it during its reciprocation.

7. In a self-loading device for carts, the combination of a wheeled frame, reciprocating devices carried by the frame, a pan carried thereby, means to turn said pan about a horizontal axis during its reciprocation, a clutch device on an axle-shaft of the wheeled frame, a counter-shaft, connections between said counter-shaft and reciprocating devices, connections between said counter-shaft and the loose member of the clutch device, and means to operate said clutch device.

8. In a self-loading device for carts, the combination of a wheeled frame, reciprocating devices carried by the wheeled frame, a pan carried thereby, means to turn said pan about a horizontal axis during its reciprocation, a clutch device on an axle-shaft of the wheeled frame, a counter-shaft, connections between said counter-shaft and reciprocating devices, connections between said counter-shaft and loose member of the clutch device, means to operate said clutch device, and clutch-releasing mechanism arranged in the path of the reciprocating devices which carry the pan.

9. In a self-loading device for carts, the combination of a wheeled frame, reciprocating devices carried by the wheeled frame, a pan carried thereby, means to turn said pan about a horizontal axis during its reciprocation, a clutch device on an axle-shaft of the wheeled frame, a counter-shaft, connections between said counter-shaft and reciprocating devices, connections between said counter-shaft and loose member of the clutch device, means to operate said clutch device, and a counter-weight connected with said counter-shaft.

10. In a self-loading device for carts, the combination of a wheeled frame, reciprocating devices carried by the wheeled frame, a pan carried thereby, means to turn said pan about a horizontal axis during its reciprocation, a clutch device on an axle-shaft of the wheeled frame, power-transmitting connections between said reciprocating devices and the loose member of the clutch device, a clutch-shifter and means to automatically release the clutch, consisting of an upright shaft $k$ carrying a finger $q$ adapted when the clutch is closed to be projected into the path of the reciprocating frame, and connections between the shaft $k$ and the clutch-shifter.

11. In a self-loading device for carts, the combination with the cart having a receptacle, of a truck detachably connected with said cart, a collecting device, and means carried by said truck for carrying the collected material from the collecting device to the receptacle on the cart.

12. In a self-loading device for carts, the combination with the cart having a receptacle, of a truck detachably connected with said cart, and a collecting device, a pan, and means carried by said truck to elevate said pan to discharge its contents into the receptacle on the cart.

13. In a self-loading device for carts, the combination with the cart having a receptacle, of a truck detachably connected with said cart, a collecting device, a pan, means carried by said truck to elevate said pan to discharge its contents into the receptacle on the cart, and means on the cart to control the operation of the pan-elevating means on the truck, having a detachable connection with said means.

14. In a self-loading device for carts, the combination with a cart having a receptacle, of a wheeled truck detachably connected with said cart, a pan carried thereby, means to elevate and turn said pan controlled by the axle-shaft of the truck, and clutch devices on the axle-shaft to connect and disconnect the axle-shaft with the means to elevate and turn the pan.

15. In a self-loading device for carts, the combination with a cart having a receptacle, of a wheeled truck detachably connected with said cart, a pan carried thereby, means to elevate and turn said pan controlled by the axle-shaft of the truck, clutch devices on the axle-shaft to connect and disconnect the axle-shaft with the means to elevate and turn the pan, and means on the cart to operate said clutch device having a detachable connection therewith.

16. In a self-loading device for carts, the combination with a cart having a receptacle, of a wheeled truck detachably connected with said cart, a pan carried thereby, means to elevate and turn said pan controlled by the axle-shaft of the truck, clutch devices on the axle-shaft to connect and disconnect the axle-shaft with the means to elevate and turn the pan, and means controlled by the pan to release the clutch after it has discharged its contents.

17. A self-loading attachment for carts consisting of a wheeled truck adapted to be detachably connected with the cart and carrying a collecting device, and means to elevate and discharge the material gathered by said collecting device.

18. A self-loading attachment for carts consisting of a wheeled truck adapted to be detachably connected with the cart, a collecting device carried by said truck, and power-transmitting connections between the axle-shaft of the truck and the collecting device.

19. A self-loading attachment for carts consisting of a wheeled truck adapted to be detachably connected with the cart, a collecting device carried by said truck, power-transmitting connections between the axle-shaft of the truck and the said collecting device, and means to elevate and discharge the material gathered by said collecting device.

20. A self-loading attachment for carts consisting of a pair of wheels and their axle-shaft, a framework carried thereby a supporting-wheel for said framework, a collecting device carried by arms hinged to said framework, and power-transmitting connections between the axle-shaft and the collecting device.

21. A self-loading attachment for carts consisting of a pair of wheels and their axle-shaft, a framework carried thereby, a supporting-wheel for said framework, a collecting device carried by arms hinged to said framework, an upward extension of said framework, means carried by said upward extension of the framework and connected with the hinged arms of the collecting device to raise and lower them, and power-transmitting connections between the axle-shaft and the collecting device.

22. A self-loading attachment for carts consisting of a pair of wheels and their axle-shaft, a framework carried thereby, a supporting-wheel for said framework, a collecting device carried by arms hinged to said framework, an upward extension of said framework, means carried by said upward extension of the framework and connected with the hinged arms of the collecting device to raise and lower them consisting of a rock-shaft $c^4$ having arms $c^5$ $c^5$ connections $c^7 c^7$ between said arms and the arms of the collecting device and the lever $c^5$ carried by the rock-shaft $c^4$, and power-transmitting connections between the axle-shaft and the collecting device.

23. A self-loading attachment for carts consisting of a pair of wheels and their axle-shaft, a framework carried thereby, a supporting-wheel for said framework, a collecting device, a pan arranged adjacent thereto, and means carried by the framework to elevate said pan from the collecting device and discharge its contents.

24. A self-loading attachment for carts, consisting of a pair of wheels and their axle-shaft, a framework supported by said axle-shaft and provided with guides, a collecting device, a pan adjacent to said collecting device, means moving in said guides to elevate said pan, power-transmitting connections between the means to elevate said pan and the axle-shaft, and means to connect and disconnect said axle-shaft with the power-transmitting connections.

25. In a self-loading device for carts, the combination of reciprocating pan-carrying arms, means to reciprocate said arms, and a pan supported by said arms with freedom of endwise movement with reference thereto.

26. In a self-loading device for carts, the combination of reciprocating pan-carrying arms, means to reciprocate said arms, a pan carried by said arms, and a longitudinally-yielding connection between said pan and arms.

27. In a self-loading device for carts, the combination of reciprocating pan-carrying arms provided on their ends with lateral guide extensions $c^5$, a pan having its back arranged in contact with said guide extensions and provided with ears adjacent thereto and a spring connection between said ears and arms whereby the pan may yield longitudinally on said guide extensions.

In testimony of which invention I hereunto set my hand.

ZENAS WHITTEMORE.

Witnesses:
F. C. DOWNING,
J. F. BEATTY.